(12) United States Patent
Knoble

(10) Patent No.: US 6,622,397 B1
(45) Date of Patent: Sep. 23, 2003

(54) SHIM MEASURING APPARATUS

(75) Inventor: Jesse Knoble, Oshkosh, WI (US)

(73) Assignee: Oshkosh Truck Corporation, Oshkosh, WI (US)

( * ) Notice: Subject to any disclaimer, the term of this patent is extended or adjusted under 35 U.S.C. 154(b) by 0 days.

(21) Appl. No.: 10/132,604

(22) Filed: Apr. 25, 2002

(51) Int. Cl.[7] .............................................. G01B 3/22
(52) U.S. Cl. ............................ 33/833; 33/549; 33/555; 33/784
(58) Field of Search ..................... 33/832, 833, 549, 33/555, 783, 784, 792, 803, 805, 600

(56) References Cited

U.S. PATENT DOCUMENTS

| | | | |
|---|---|---|---|
| 1,656,302 A | 1/1928 | Swaney | |
| 2,525,068 A | 10/1950 | Ericson et al. | 33/174 |
| 3,191,259 A | 6/1965 | Dalton | 29/201 |
| 3,698,056 A | 10/1972 | Pierce et al. | 29/201 |
| 3,817,640 A | 6/1974 | Carter et al. | 403/138 |
| 4,237,613 A | 12/1980 | Slough et al. | 33/172 |
| 4,468,861 A | 9/1984 | Overland | 33/168 |
| 4,576,499 A | 3/1986 | Smith | 403/27 |
| 4,642,900 A | 2/1987 | Provost et al. | 33/169 |
| 4,744,153 A | 5/1988 | Brand | 33/517 |
| 4,993,165 A | 2/1991 | French et al. | 33/606 |
| 5,074,578 A | * 12/1991 | Grove et al. | 280/86.753 |
| 5,077,909 A | 1/1992 | Cranor | 33/607 |
| 5,115,558 A | 5/1992 | Bernhardt et al. | 29/705 |
| 5,385,050 A | 1/1995 | Roberts | 73/597 |
| 5,388,057 A | 2/1995 | January | 364/555.01 |
| 5,503,374 A | 4/1996 | Hellon | 267/281 |
| 5,787,596 A | * 8/1998 | Mishima et al. | 33/533 |
| 6,021,580 A | * 2/2000 | Manfredotti et al. | 33/712 |
| 6,079,278 A | 6/2000 | Ishida | 73/796 |
| 6,125,541 A | 10/2000 | Parker | 29/898.051 |
| 6,415,526 B1 | * 7/2002 | Buckner et al. | 33/833 |
| 6,473,987 B1 | * 11/2002 | Steere et al. | 33/783 |
| 2002/0152628 A1 | * 10/2002 | Buckner et al. | 33/833 |

* cited by examiner

Primary Examiner—Christopher W. Fulton
Assistant Examiner—Yaritza Guadalupe
(74) Attorney, Agent, or Firm—Foley & Lardner

(57) ABSTRACT

A shim measuring apparatus to determine the thickness of a shim, with the shim used with a ball joint including a snap-ring and a controlled arm having a bore and a notch. The measuring apparatus comprises an upper housing including a measuring device and a lower housing coupled to the upper housing. The lower housing is configured to receive the ball joint and to engage the notch in the bore. The distance between the upper housing and the lower housing while a load is applied is measured by the measuring device. Such distance between the upper housing and the lower housing represents the shim thickness.

20 Claims, 2 Drawing Sheets

SHIM MEASURING APPARATUS

BACKGROUND OF THE INVENTION

The invention relates to methods and apparatus for determining the thickness of a shim or shims required for positioning a ball joint in a suspension assembly of the vehicle. More particularly, the invention relates to such methods and apparatus to determine the as-built shim thickness.

In the past, persons making repairs in the field or in the manufacturing of suspension assemblies for vehicles, attempting to determine the required thickness of a shim for positioning or loading of the ball joint assembly usually required the complete assembly of the vehicle suspension assembly with a shim in place and then determined whether the ball joint was properly supported. The shim prevents end play of the ball joint in the suspension assembly. If the shim did not have the proper thickness it was necessary to remove the ball joint, replace the shim with another shim, either thicker or thinner, and reassemble the suspension assembly. This process was repeated until the proper shim thickness was found. Obviously, this required a great deal of time and effort.

The determination of this shim thickness for a ball joint in the suspension assembly of a vehicle having independent suspension, is extremely difficult because of end-play in the ball joint. Measurements for ball joint wear have a small margin for error requiring precise installation and measuring. Typical accuracy is the in the neighborhood of 0.001 inch.

Thus, there is a need for an apparatus and a method for determining the thickness of a shim for proper positioning of a ball joint in a suspension assembly of a vehicle before the suspension assembly is mounted to the vehicle.

SUMMARY OF THE INVENTION

There is provided a shim measuring apparatus to determine the thickness of a shim, with the shim used with a ball joint including a snap-ring and a control arm having a bore and a notch. The measuring apparatus comprises an upper housing including a measuring device and a lower housing coupled to the upper housing. The lower housing is configured to receive the ball joint and snap-ring and to engage the notch in the bore. The distance between the upper housing and the lower housing, while a load is applied, is measured by the measuring device. Such distance between the upper housing and the lower housing represents the shim thickness. The shim thickness represents the as built thickness of the shim to be used with the ball joint and snap-ring in the control arm. One embodiment provides that the measuring device is a dial indicator. A further embodiment provides the lower housing includes a collet ring having a plurality of collet fingers and a handle ring including a bearing ring and a taper ring wherein the collet fingers are configured to releasably engage the notch in the bore of the control arm.

There is also provided a measuring apparatus to determine the thickness of a shim, with the shim used with a ball joint including a snap-ring in a control arm having a bore and a notch. The measuring apparatus comprises a first means for housing including a means for measuring and a second means for housing coupled to the first means for housing. The second means for housing is configured to receive the ball joint and the snap-ring and engage the notch in the bore. The distance between the first means for housing and the second means for housing, while a load is applied, is measured by the means for measuring. The distance measured represents the shim thickness. A further embodiment provides that the first means for housing reflects the sum of a plurality of planes defined by the ball joint and the measuring apparatus in the bore of the control arm and the second means for housing reflects an upper plane of the notch in the bore. A further embodiment provides the measuring apparatus wherein the second means for housing including a collet ring having a plurality of means for engaging and a means for turning including a bearing ring and a means for pushing, wherein the means for engaging is configured to releasably engage the notch.

There is also provided a method for determining the as-built thickness of a shim used with a ball joint and snap-ring in a control arm, with the control arm having a bore and a notch. The method includes using a measuring apparatus having an upper housing including a measuring device and a lower housing including a collet ring having plurality of collet fingers, a handle ring including a bearing ring retaining ball bearings, and a taper ring. The method comprises the steps of installing a lower housing in the bore of the control arm and installing the ball joint in the lower housing and placing the snap-ring on the ball joint. The ball joint is positioned 180° from its usual working position. Then coupling the upper housing to the lower housing and applying an external, axial force to the measuring apparatus. Turning the handle ring in a counter-clock-wise direction, wherein the collet fingers engage an upper plane of the notch. Than reading the measuring device to obtain the distance between the upper housing and the lower housing, while under load, which represents the as-built shim thickness. Another embodiment includes a step of reading each measuring device which is at least two dial indicators and averaging the readings of all the dial indicators to obtain the shim thickness. Another embodiment includes the step of coupling a torque limiting assembly to the handle ring wherein the turning of the handle ring is limited to a torque sufficient to force the collet fingers up against the upper plane of the notch. The torque limiting assembly can provide a set screw for setting the torque limit by adjusting the set screw in the torque limiting assembly.

DETAILED DESCRIPTION OF THE PREFERRED EMBODIMENTS

Figure 1:
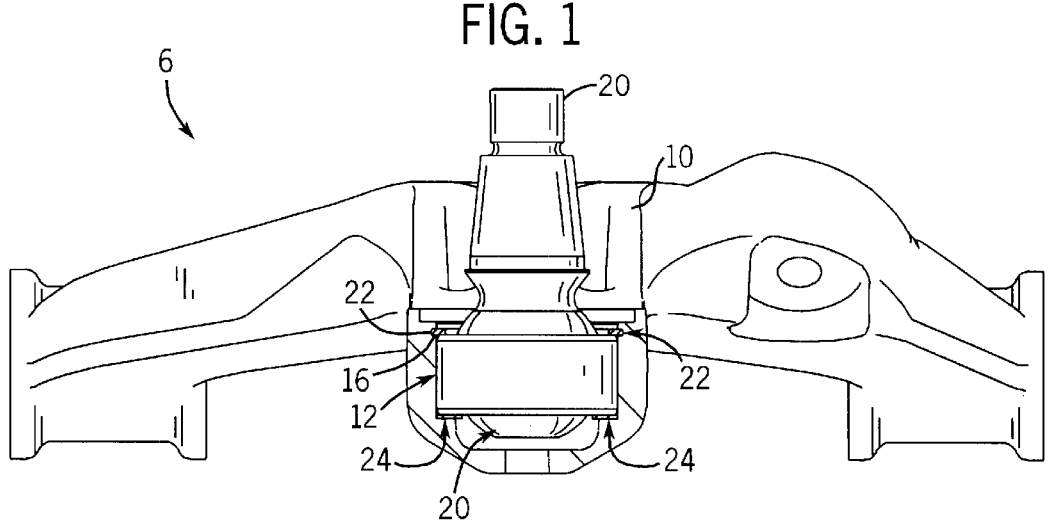
FIG. 1 is a partial sectional plan view of a suspension assembly, for a vehicle, having a controlled arm defining a control arm bore and a notch, with a ball joint installed, orientated in its usual working position, in the bore and retained with a snap-ring and positioned by an as-built shim.

Referring to FIG. 1, there is illustrated a control arm 10 of a suspension assembly 6. The suspension assembly 6 is typically a part of a vehicle 5 (not shown) to couple a wheel assembly to a vehicle frame. The control arm 10 includes a control arm bore 12. The bore 12 also has a notch 16. The notch 16 typically is annular and is configured to engage a snap-ring 22. A ball joint 20, which is part of the suspension assembly 6, is inserted in the bore as shown in FIG. 1. As shown in FIG. 1, the ball joint 20 is in its usual working position. The snap-ring 22 maintains the ball joint 20 in position.

Also shown in FIG. 1, is a shim 24. The shim 24 is used to properly position the ball joint 20 in the control arm 10 of the suspension assembly 6. Because of manufacturing variances and a variety of other dimensional variances, a shim thickness may vary from unit to unit. Because of these variance in shim thickness, it is necessary to determine the specific "as-built" shim thickness to properly position the ball joint 20. Another function of the shim, is to eliminate or minimize end play along the longitudinal axis of the ball joint 20 as shown in FIG. 1.

In order to determine the proper as-built shim thickness for a given control arm 10 and ball joint 20, it is necessary to place the ball joint and associated snap-ring 22 under a load which is representative of the load experienced by the ball joint during inspection of the suspension for ball joint wear. In the past, it was necessary to assemble the suspension assembly 6 to the vehicle 5 together with the ball joint 20 in place and speculate on the proper shim thickness. If there was to much end play in the ball joint 20, it was necessary to disassemble the system and place a thicker shim in the bore, then reassemble and remeasure. If the system was too tight, a thinner shim would have to be used and a reassembly and remeasurement performed. Such assembly and disassembly was time consuming under the best of conditions.

The present invention provides a shim measuring apparatus 30 to determine the thickness of a shim 24 that is used with a ball joint 20.

Figure 2:
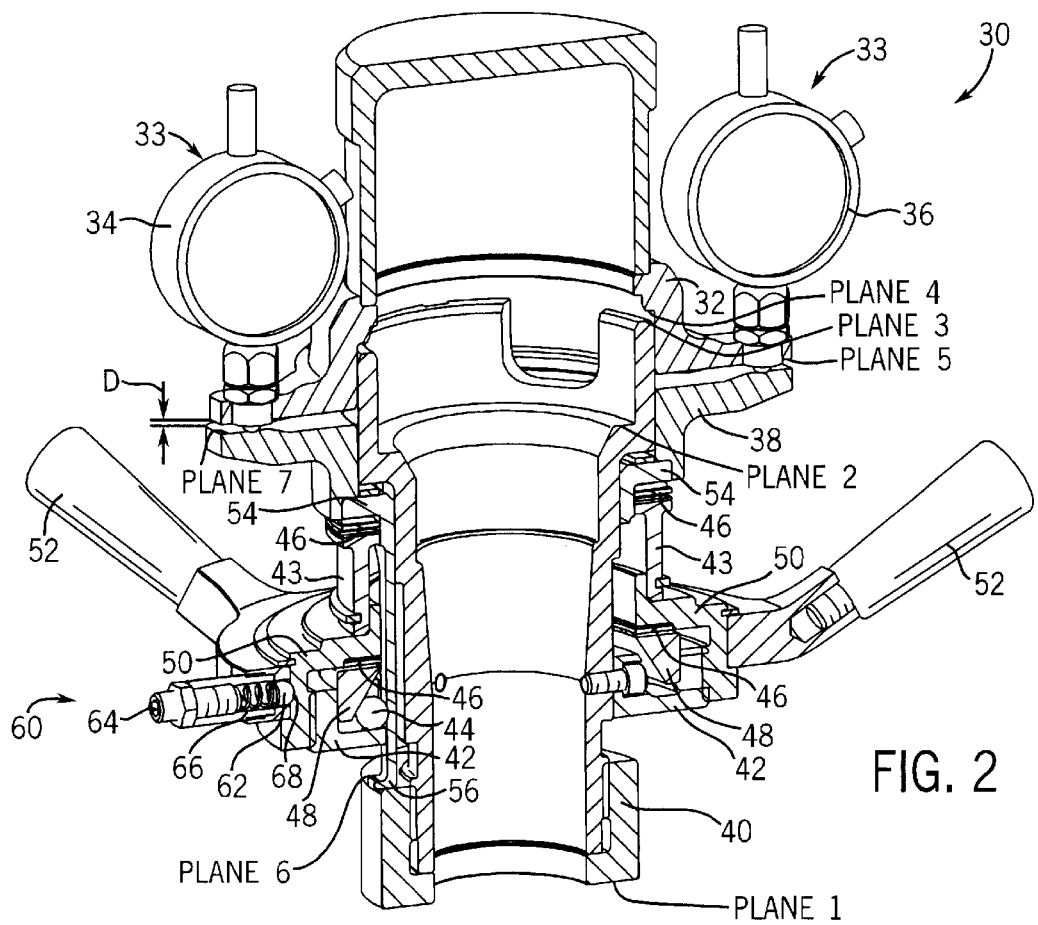
FIG. 2 is a sectional view of an exemplary embodiment of a shim measuring apparatus.

Referring to FIG. 2, the measuring apparatus 30 comprises an upper housing 32 including a measuring device 33 and a lower housing 38 releasably coupled to the upper housing 32. The lower housing 38 is configured to receive the ball joint 20 and snap-ring 22 and engage the notch 16 in the bore 12. The Distance D between the upper housing 32 and the lower housing 38, while a load is applied, as measured by the measuring device 33, represents the as-built shim 24 thickness.

The upper housing 32 supports one or more measuring devices 33, as illustrated in FIG. 2 a first dial indicator 34 and a second dial indicator 36 are the measuring devices 33. The measuring devices 33 are supported on the upper housing 32. The measuring devices 33 are aligned along a Plane 5, the significance of which will be discussed below.

The lower housing 38 includes a block base 40, and a bearing ring 42 which retains ball bearings 44. There is also a taper ring 48 coupled to the bearing ring 42 and aligned to selectively engage the ball bearings 44. Any number of ball bearings 44 can be retained in the bearing ring 42. The exemplary embodiment shown in the figures has three ball bearings.

A handle ring 50 having one or more handles 52 is coupled to the bearing ring 42 and taper ring 48 assembly which in turn is coupled to a collet ring 54. The collet ring 54 has a plurality of collet fingers 56 spaced around the circumference of the base block 40. The number of collet fingers 56 will equal the number of ball bearings 44. A bearing collar 43 supporting a thrust bearing 46 is coupled to the collet ring 54 and the handle ring 50. The collet fingers 56 are configured to engage the notch 16 at a Plane 6 which is the upper wall of the notch 16 (see FIG. 3). A collet finger 56 will also contact the ball bearings 49 as explained below.

The upper housing 32 reflects the sum of four Planes and is represented by Plane 5. See FIG. 2. Plane 1 is the bottom of the base block 40 of the lower housing 38. Plane 2 is the interface between the shelf on the lower housing 38 and a portion of the ball joint 20. Plane 3 is the top surface of the lower housing 38. Plane 4 is a shelf in the upper housing 32 which is in contact with the ball joint 20 when the ball joint is inserted into the lower housing 38 of the shim measuring apparatus 30. The sum of such Planes 1–4 is reflected in plane 5 which is one of the surfaces used to determine the distance D between the upper housing 32 and the lower housing 38 and is measured by the measuring device 33 during the operation of the shim measuring apparatus 30.

Plane 7 reflects the upper wall of the notch 16 as a result of the collet finger 56 engaging the notch 16, the bearing collar 43, thrust bearing 46 and the lower housing 38. Plane 7 is the surface on the lower housing 38 that provides the other point of measurement in determining the distance D between the upper housing 32 and the lower housing 38 as measured by the measuring device 33. The shim measuring apparatus 30 measures the distance between Planes 5 and 7, which are representative of the above identified Planes rather than specific points. By referencing these Planes the various parts used in the shim measuring apparatus determine inaccessible gap between the ball joint 20 and the bottom of the bore 12 in the control arm 10 of the suspension assembly 6. By placing an axial load on the shim measuring apparatus 30 with a ball joint 20 and the corresponding snap-ring 22 installed in the shim measuring apparatus 30 the as-built shim thickness is obtained. This process can be done during the manufacturing procedure and it is contemplated that it could be done during a field repair without a complete disassembly and reassembly of the vehicle 5 suspension assembly 6 to determine the as-built shim thickness.

The handle ring 50 typically is provided with a plurality of handles 52 positioned conveniently around the handle ring 50. The handle ring 50 can also include a torque limiting assembly 60 configured to limit the torque applied to the handle ring 50 during operation of the measuring apparatus 30. The torque limiting assembly 60 includes a detent ball 62 which is biased by a spring 66. The detent ball 62 is configured to selectively engage a detent pocket 68 formed in the handle ring 50. A threaded set screw 64 is used to adjust the spring 66 loading of the detent ball 62.

In operation the detent ball resides in the detent pocket 68. As the handle 52 of the handle ring 50 are rotated in a counter-clockwise manner, the handle ring 50 pushes against the bearing collar 43 which in turn pushes the thrust bearings 46 against the collet ring 54, which action causes the collet fingers 56 to engage the notch 16 in the control arm bore 12. Such action sets the shim measuring apparatus 30 in the control arm bore 12. The torque applied to the handles 52 is limited by the preloading or breakaway torque set by the set screw 64 against the detent ball 62. When the preset torque is exceeded, the detent ball 62 disengages from the detent pocket 68 and the handle ring rotates freely and no additional torque is applied. The applied torque is varied by the setting of the set screw 64. Various applied torques equal to various readings on the measuring devices 33 due to the collet finger 56 flexing under load can be obtained. The torque limiting assembly 60 allows a constant and repeatable loading on the collet fingers 56 which allows a constant and repeatable reading on the measuring devices 33.

The handle ring 50 is threaded on the ball bearing ring 44. Rotating the handle ring causes it to travel in a vertical direction with respect to the ball joint 20. A counter-clockwise rotation causes the handle ring 50 to move up which in turn pushes the bearing ring 42 into the collet ring 54 which causes the collet fingers 56 to be pressed into the notch 16 of the control arm bore 12. When the handle ring 50 is rotated in a clockwise direction, the handle ring 50 moves down which allows the collet ring 54 to rest back on the base block 40 and pushes the taper ring 48 down over the ball bearings 44 which in turn engage the collet fingers 56 and push the collet fingers 56 out of the notch 16. Such action disengages the collet fingers 56 from the notch 16 and allows the shim measuring apparatus 30 to be removed from the control arm 10. During these operations, a force is applied to the measuring device 33 to hold the device 33 in place and to flex the snap-ring in "an assembled state" to determine the shim thickness which will be explained below.

Figure 3:
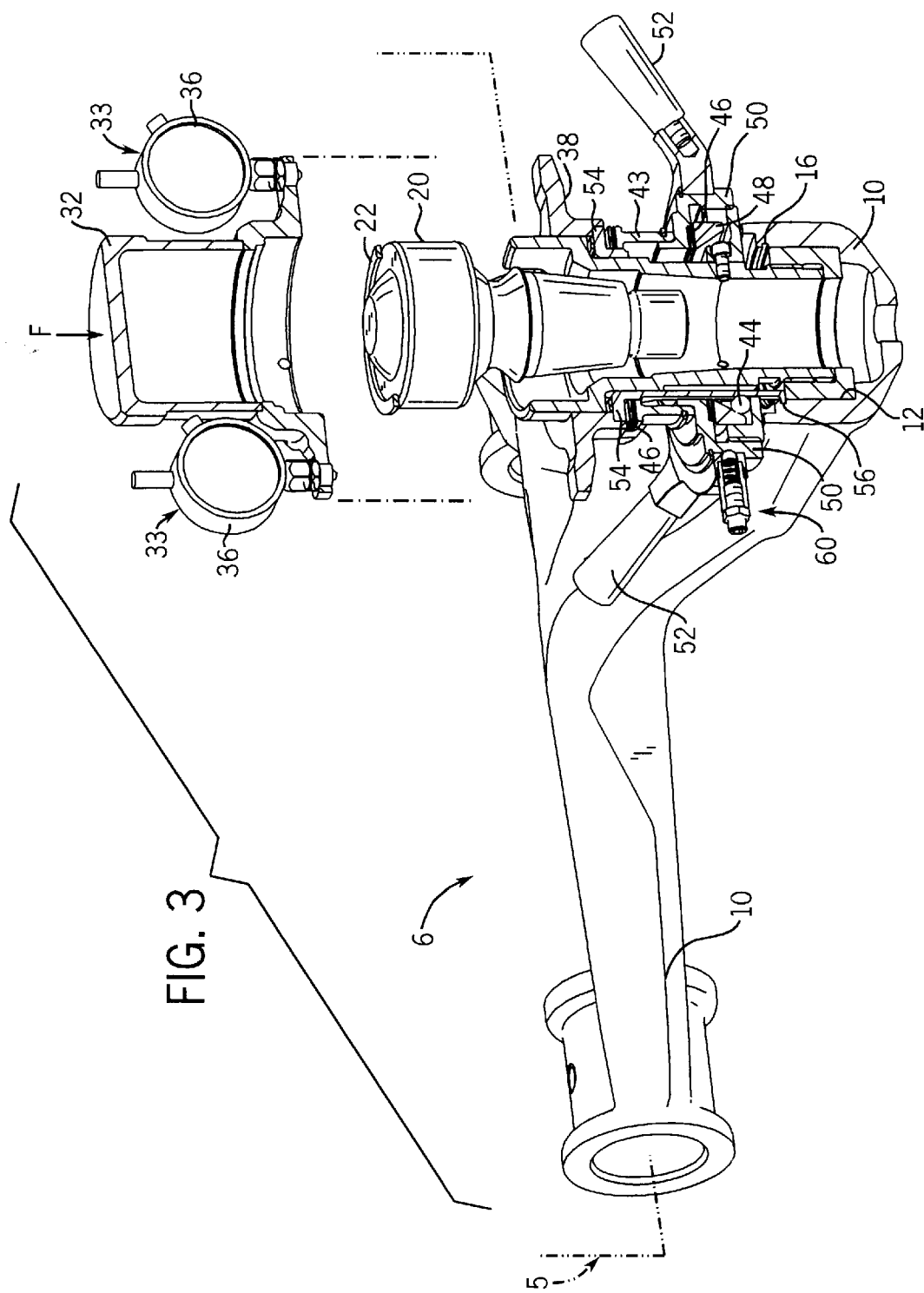
FIG. 3 is a partial exploded sectional view of an exemplary embodiment of a shim measuring apparatus installed in a bore of a control arm of a suspension assembly of a vehicle, with a ball joint and snap-ring aligned (180° from its usual working position) for installation in the shim measuring apparatus prior to the determination of the thickness of a shim to be used with the ball joint.

A method for determining the as-built thickness of a shim 24 used with a ball joint 20 in a snap-ring 22 in a control arm 10 will now be explained. The control arm 10 has a bore 12 and a notch 16. The method comprises the steps of installing the lower housing 38 of the shim measuring apparatus 30 in the bore 12 of the control arm 10. Then installing the ball joint 20 and a snap-ring 22 in the lower housing 38. The ball joint 20 is positioned 180° from its usual working position. The usual working position of the ball joint is depicted in FIG. 1. The position of the ball joint 20 and snap-ring 22 for purposes of determining the shim 24 thickness during the measuring operation is depicted in FIG. 3. Continuing the method, the a upper housing 32 is then coupled to the lower housing 38. The snap-ring 22 is now within the confines of the upper housing 32. An external axial force F is applied to the measuring apparatus 30. The operator then turns the handle ring 50 in a counter-clockwise direction wherein the collet fingers 56 engage an upper plane P6 of the notch 16 in the control arm bore 12. A reading on the measuring device 33 is used to obtain the distance D between the upper housing 32 and the lower housing 38, while under load, which represents the as-built shim 24 thickness. An appropriate shim 24 can then be placed in the control arm bore 12 as shown in FIG. 1 and the ball joint 20 installed in its normal operating position and retained in place by the snap-ring 22 also shown in FIG. 1 with the properly sized shim installed. End play of the ball joint 20 is minimized or eliminated in the control arm 10. More than one measuring device 33 can be utilized. For example, at least two dial indicators 34, 36 can be utilized with the operator reading each dial indicator and then averaging the readings of all the dial indicators to obtain the shim 24 thickness. It should be understood that other types of measuring devices, for example a laser measuring apparatus or a digital caliper can be used instead of a dial indicator.

It is also contemplated that variable loads can be applied to the measuring apparatus 30. A typical load is 1400 pounds that is applied with a pneumatic ram. Such axial force represents an assembled state of the ball joint 20 and its associated parts in the control arm 10 and such axial force holds-all the parts and surfaces together in a tight fashion during the measuring feature.

After the measuring devices 33 are read and the as-built shim thickness is determined, the upper housing 32 is uncoupled from the lower housing 38 and the snap-ring 22 removed. The ball joint 20 is removed from the lower housing 38 and the lower housing 38 is removed from the bore 12 of the control arm 10. The procedure of manufacturing the suspension assembly 6 of the vehicle 5 can then proceed. It should also be understood that the ball joint 20 can be replaced during a repair procedure in the field with the shim 24 thickness being appropriately measured utilizing the shim measuring apparatus 30.

From time to time, before a new measuring apparatus 30 can be used, it must be calibrated. Also, the measuring apparatus 30 is checked periodically to assure that it is providing accurate measurements. Such checking is typically done on a weekly basis. The calibration process is accomplished by using a standard calibration block in which each measuring apparatus 30 is checked.

Thus, there is provided a shim measuring apparatus to determine the thickness of a shim in a control arm 10 of a suspension assembly 6. While several embodiments of the present invention have been disclosed in detail herein, various modifications may be made. Workers skilled in the art will recognize that changes may be made in the form and detail without departing from the spirit and scope of the invention. The shim measuring apparatus is described with reference to preferred embodiments and set forth in the following claims as manifestly intended to be as broad as possible.

What is claimed is:

1. A shim measuring apparatus to determine the thickness of a shim while the measuring apparatus is engaged by a variable load device, with the shim used with a ball joint including a snap-ring in a control arm having a bore and a notch, the measuring apparatus comprising:

an upper housing including a measuring device; and, a lower housing coupled to the upper housing and configured to receive the ball joint and snap-ring and engage the notch in the bore, wherein the distance between the upper housing and the lower housing while an external, axial force is applied to the shim Measuring apparatus by the variable load device, as measured by the measuring device, represents the shim thickness.

2. The shim measuring apparatus of claim 1, wherein the upper housing reflects the sum of a plurality of planes defined by the ball joint and measuring apparatus in the bore of the control arm, and the lower housing reflects an upper plane of the notch, wherein the "as-built" shim thickness is obtained.

3. The shim measuring apparatus of claim 1, wherein the measuring device is at least one dial indicator.

4. The shim measuring apparatus of claim 1, wherein the lower housing includes a collet ring having a plurality of collet fingers, and a handle ring including a bearing ring and taper ring.

5. The shim measuring apparatus of claim 4, wherein the collet fingers are configured to releaseably engage the notch.

6. The shim measuring apparatus of claim 4, wherein the handle ring includes a torque limiting assembly configured to limit the torque applied to the handle ring during operation of the measuring apparatus.

7. The shim measuring apparatus of claim 4, wherein the taper ring is configured to engage ball bearings retained in the bearing ring, wherein the bearings push the collet fingers out of the notch.

8. A measuring apparatus to determine the thickness of a shim While the measuring apparatus is engaged by a variable load device, with the shim used with a ball joint including a snap-ring in a control arm having a bore and a notch, the measuring apparatus comprising:

an first means for housing including a means for measuring; and, a second means for housing coupled to the first means for housing and configured to receive the ball joint and snap-ring and engage the notch in the bore, wherein the distance between the first means for housing and the second means for housing while an external axial force is applied to the measuring apparatus by the variable load device, as measured by the means for measuring, represents the shim thickness.

9. The measuring apparatus of claim 8, wherein the first means for housing reflects the sun of a plurality of planes defined by the ball joint and the measuring apparatus in the bore of the control arm, and the second means for housing reflects an upper plane of the notch, wherein the "as-built" shim thickness is obtained.

10. The measuring apparatus of claim 8, wherein the means for measuring is at least one dial indicator.

11. The measuring apparatus of claim 8, wherein the second means for housing includes a collet ring having a plurality of means for engaging, and a means for turning including a bearing ring and means for pushing.

12. The measuring apparatus of claim 11, wherein the means for engaging are configured to releaseably engage the notch.

13. The measuring apparatus of claim 11, wherein the means for turning includes a means for limiting torque configured to limit the torque applied to the means for turning during operation of the measuring apparatus.

14. Tire measuring apparatus of claim 11, wherein the means for pushing is configured to push ball bearings retained in the bearing ring, wherein the bearings push the means for engaging out of the notch.

15. A method for determining the thickness of a shim used with a ball joint and snap-ting in a control arm, with the control arm having a bore and a notch, using a measuring apparatus having an upper housing including a measuring device and a lower housing including a collet ring having a plurality of collet fingers, a handle ring including a bearing ring retaining ball bearings and a taper ring, the method comprising the steps of:

installing the lower housing in the bore of the control arm;

installing the ball joint and snap-ring in the lower housing, with the ball joint positioned 180° from its usual working position;

coupling the upper housing to the lower housing;

applying an external, axial force to the measuring apparatus;

turning the handle ring in a counter-clock-wise direction, wherein the collet fingers engage an upper plane of the notch; and, reading the measuring device to obtain the distance between the upper housing and lower housing, while under load, which represents the as-built shim thickness.

16. The method for determining the thickness of a shim of clam 15, wherein the measuring device is at least two dial indicators and the step of reading includes reading each dial indicator, and includes the step of averaging the readings of all the dial indicators to obtain the shim thickness.

17. The method for determining the thickness of a shim of claim 15, including coupling a torque limiting assembling to the handle ring, wherein the turning of the handle ring is limited to a torque sufficient to force the collet fingers up against the upper plane of the notch.

18. The method for determining the thickness of a shim of claim 17, including the step of setting the torque limit by adjusting a set screw in the torque limiting assembly.

19. The method for determining the thickness of a shim of claim 15, including the step of turning the handle ring in a clock-wise direction wherein the taper ring pushes ball bearings retained in the bearing ring against the collet fingers to disengage the collet fingers from the notch.

20. The method for determining the thickness of a shim of claim 19, including the step of uncoupling the upper housing from the lower housing, removing the ball joint and snap-ring from the lower housing, and removing the lower housing from the bore of the control arm.

* * * * *